Figure 1:
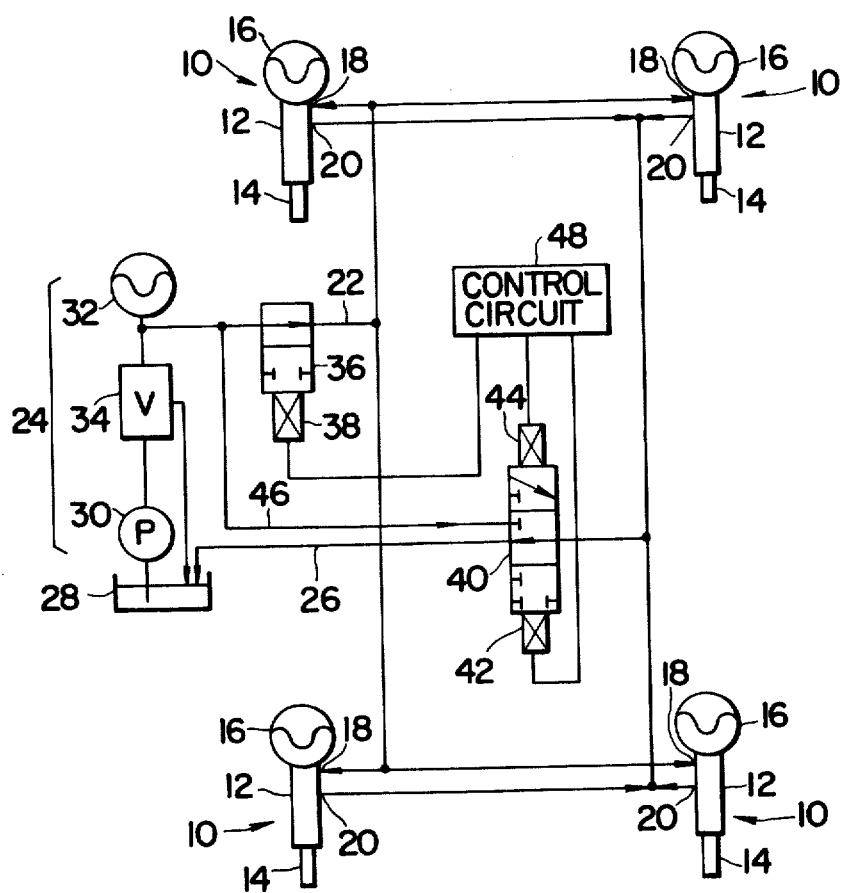

United States Patent
Aikawa et al.

[11] 3,913,938
[45] Oct. 21, 1975

[54] SELF-LEVELLING VEHICLE SUSPENSION SYSTEM

[75] Inventors: Hiroshi Aikawa, Tokyo; Naganori Ito, Higashikurume, both of Japan

[73] Assignee: Nissan Motor Company Limited, Yokohama, Japan

[22] Filed: July 3, 1974

[21] Appl. No.: 485,451

[30] Foreign Application Priority Data
July 4, 1973 Japan............................. 48-74687

[52] U.S. Cl............................ 280/112 A; 280/124 F
[51] Int. Cl.².......................................... B60G 11/26
[58] Field of Search ............ 280/112 A, 124 F, 6 R, 280/6 H; 180/103, 41

[56] References Cited
UNITED STATES PATENTS
3,666,286  5/1972  Engfer............................ 280/124 F
3,683,818  8/1972  Meir................................ 280/112 A Primary Examiner—Philip Goodman

[57] ABSTRACT

A self-levelling suspension system of an automotive vehicle, comprising at least one hydropneumatic suspension unit which is contractable and extendible in accordance with a load on a vehicle body, and an electrically operated hydraulic fluid control arrangement which is operative to provide in the suspension unit a first condition to maintain a self-levelling function, a second condition to cause the suspension unit to lose its self-levelling function and to merely act as a shock absorber, and a third condition in which the fluid in the suspension unit is increased beyond a level available for the self-levelling operation so that the suspension unit can be utilized as a vehicle jack-up device. The second condition of the suspension unit is achieved when the vehicle must take a meandering path or when the vehicle sideways rolls or sways.

4 Claims, 2 Drawing Figures

SELF-LEVELLING VEHICLE SUSPENSION SYSTEM

The present invention relates to a suspension system of an automotive vehicle and, more particularly, to a vehicle suspension system of the self-levelling type. The self-levelling vehicle suspension system includes one or more hydro-pneumatically operated suspension struts to each of which fluid under pressure is supplied so that the body of the vehicle suspended by the struts is automatically level-adjusted in accordance with variation in the suspended weight of the vehicle and accordingly the vehicle body is constantly maintained at a prescribed level irrespective of the amount load exerted on the suspension system.

The suspension strut is automatically adjusted in length by means of a self-levelling valve which is incorporated into the suspension strut and which is responsive to the jounce and rebound of road wheels of the vehicle as caused when the vehicle encounters road irregularities during cruising. The level control valve is usually provided with a suitable means capable of dampening oscillations transferred to the control valve from the road wheels so that the valve is actuated to close or open the fluid passage at a retarded timing and is thereby prevented from hunting.

When the vehicle equipped with the self-levelling suspension system thus arranged is cruising on a curved road and tends to sideways roll or sway, the self-levelling struts become operative to eliminate the lateral inclination or roll angle of the vehicle body. Because of the delay time which is preset on the level control valve, however, such actions of the struts are initiated at a certain interval after the valve has detected the inclined condition of the vehicle body. If, for this reason, the vehicle must take a "slalom" or serpentine zigzag path on a meandering road, the self-levelling struts will fail to properly adjust the position of the vehicle body. When, for example, the vehicle is about to move from a right-hand curved path into a left-hand curved path, the right suspension struts will be supplied with the operating fluid and brought into extended conditions under the control of the level control valve. When the vehicle is then moved into the left-hand curved, the operating fluid pressure is kept applied to the left suspension struts for a certain period of time that corresponds to the delay time of the level control valve even though the vehicle tends to roll in a reverse lateral direction. The vehicle will consequently be saliently inclined leftwardly. This gives the vehicle occupant a feeling of unrest and, in the worst case, would jeopardize the driver's directional control over the vehicle. From the view point of precluding these problems, it is considered advantageous to have the self-levelling suspension system controlled in a manner to temporarily lose its self-levelling function and to merely act as a shock absorber when the vehicle is running or about to run in a serpentine zigzag path.

As is well known in the art, the vehicle suspension system of the self-levelling type, the self-levelling struts can be utilized as jack-up devices for repair or trouble shooting purposes. Where the self-levelling suspension struts are to be used as the jack-up devices, it is important that the suspension system be provided with a hydraulic valve arrangement which is operative to maintain an increased fluid pressure in one or more suspension struts so as to lift the vehicle body locally or in its entirety. The self-levelling vehicle suspension system herein disclosed is serviceable, when desired, as a jack-up device.

It is, thus, an important object of the present invention to provide an improved hydropneumatically-operated self-levelling vehicle suspension system which is adapted to achieve improved ride, vehicle controllability, and vehicle handling.

It is another important object of the invention to provide an improved hydro-pneumatically-operated self-levelling vehicle suspension system which is capable of normally acting as a means to automatically adjust the level of a vehicle body temporarily acting as a shock absorber when the vehicle is running or about to run on a meandering road.

It is still another object of the invention to provide an improved hydro-pneumatically operated self-levelling vehicle suspension system which is serviceable not only as a suspension system but as a jack-up device when desired.

It is still another object of the invention to provide an improved hydro-pneumatically-operated self-levelling vehicle suspension system having a fail-safe arrangement which is adapted to cause the suspension system to lose its self-levelling function not only when the vehicle must take a serpentine zigzag path but in the event a failure takes place in control means (hydraulic or electric) of the suspension system.

In accordance with the present invention, these objects will be accomplished in a self-levelling suspension system which comprises at least one hydro-pneumatic suspension unit actuated by a fluid pressure for adjusting the vertical position of the suspended portion of the vehicle body, an operating fluid supply line for providing communication between the suspension unit and a source of operating fluid for feeding the operating fluid to the suspension unit from the fluid source when open, a fluid discharge line which leads from the suspension unit for discharging the fluid from the suspension unit when open, a first valve means disposed in the fluid supply line for shutting off the fluid supply line when actuated, a second valve means disposed in the fluid discharge line for shutting off the fluid discharge line when actuated, and control means responsive to side roll of the vehicle body for actuating the first and second valve means to close the fluid supply and discharge lines in response to a vehicle roll angle larger than a predetermined limit.

In accordance with the present invention, there will be further provided a self-levelling suspension system which comprises at least one hydro-pneumatic suspension unit actuated by a fluid pressure for adjusting the vertical position of the suspended portion of the vehicle body, a main operating fluid supply line to provide communication between the suspension unit and a source of operating fluid for feeding the operating fluid to the suspension unit from the fluid source when open, a fluid discharge line which leads from the suspension unit for discharging the fluid from the suspension unit when open, a first valve means disposed in the fluid supply line for shutting off the fluid supply line when actuated, a second valve means disposed in the fluid discharge line and having first and second valve actuating means, an auxiliary operating fluid supply line for providing communication between the source of the operating fluid and the fluid discharge line through the second valve means, the second valve means having a first position to open the fluid discharge line and to close the auxiliary operating fluid line, a second position to close the fluid discharge line and the auxiliary operating fluid supply line, and a third position to close the fluid discharge line and to provide communication between the fluid discharge line and the auxiliary operating fluid supply line, the second valve means being in the first position when both of the first and second valve actuating means are inoperative, in the second position when the first valve actuating means is actuated and in the third position when the second valve actuating means is actuated, and control means responsive to side roll of the vehicle body and including a switch means having a first position to enable the first valve means and the first valve actuating means of the second valve means to be actuated in response to the side roll of the vehicle and a second position to actuate the second valve actuating means of the second valve means.

The control means preferably comprise an angle sensing means responsive to a vehicle roll angle for producing an output voltage proportional to the detected vehicle roll angle, an integrating circuit for integrating the output voltage of the angle sensing means with respect to time for producing an integrated output voltage, a voltage dividing circuit producing an output voltage proportional to the integrated output voltage from the integrating circuit, and a switching circuit connected to an output terminal of the voltage dividing circuit and operative to be conductive for actuating the first and second valve means or, more specifically, the first valve means and the first valve actuating means of the second valve means when the output voltage from the voltage dividing circuit is higher than a predetermined level which is in agreement with the predetermined limit of the vehicle roll angle.

Figure 2:
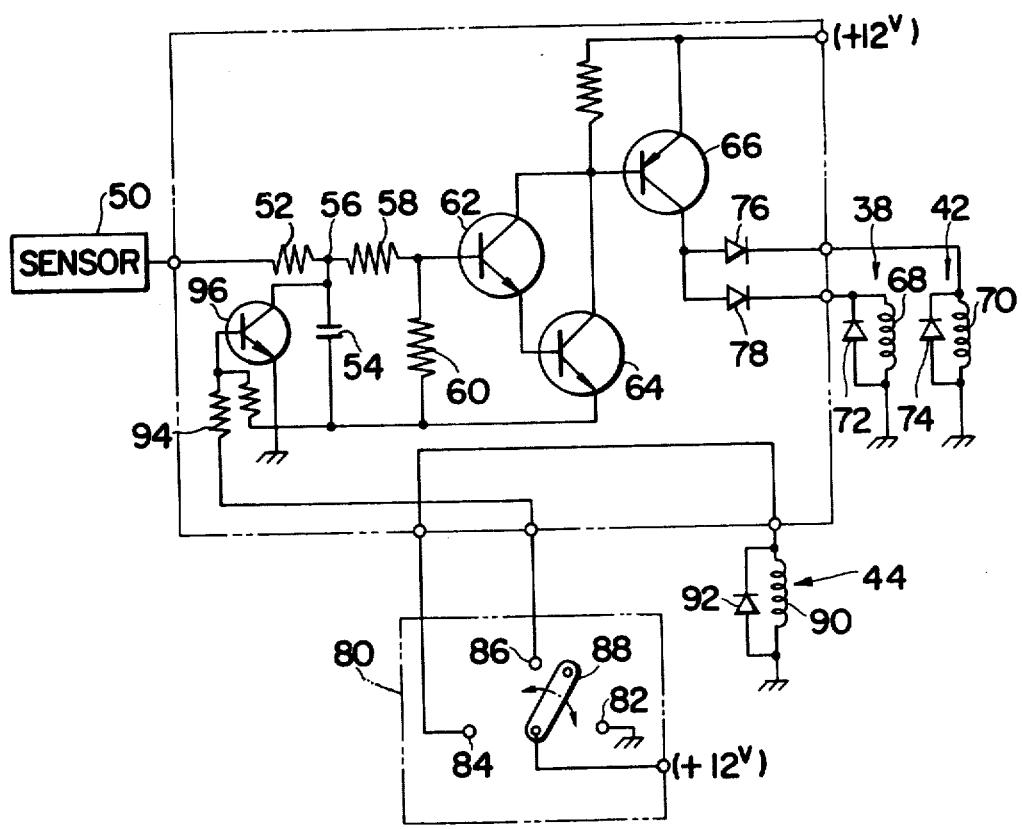

The features and advantages of the self-levelling vehicle suspension system according to the present invention will become more apparent from the following description taken in conjunction with the accompanying drawings, in which:

FIG. 1 is a diagram which schematically shows a preferred embodiment of the self-levelling suspension system according to the present invention; and FIG. 2 is a diagram which shows a preferred example of an electric control circuit to be incorporated into the vehicle suspension system illustrated in FIG. 1.

Referring to the drawings, first to FIG. 1, the self-levelling vehicle suspension system embodying the present invention is illustrated as comprising a pair of front hydro-pneumatic suspension units and a pair of rear hydro-pneumatic suspension units, all of which suspension units are designated by a common reference numeral 10. Each of the hydro-pneumatic suspension units 10 consists of a cylinder 12, a piston (not shown) movable in the cylinder and connected to a piston rod 12 which projects outwardly of the cylinder and a pneumatic spring which is occupied with air or other gas under pressure to provide an elastically yieldable cushion which renders the suspension unit elastic. The cylinder 10 and the piston rod 12 are connected at their ends between a suspended part of the vehicle body and a suspension arm, though not shown in the drawing. The cylinder 10 has accommodated therein a self-levelling valve (not shown) which is operative to automatically control an overall length of the suspension unit 10 or the axial positions of the piston and piston rod relative to the cylinder responsive to variation in the amount of load exerted on the suspension unit so that the vehicle body is at all times maintained at a predetermined level over the ground level irrespective of the amount of load on the vehicle body. The construction and operation of the hydro-pneumatic suspension unit thus arranged are well known in the art of vehicle suspension and are rather immaterial for the understanding of the gist of the present invention. No further description as to details of the suspension unit 10 will therefore be herein resorted to.

Each of the hydro-pneumatic suspension units 10 or, more specifically, the cylinder 12 of each suspension unit 10, has a fluid inlet port 18 and a fluid outlet port 20. The fluid inlet ports 18 in the cylinders 12 are in communication through a common operating fluid line 22 with a source 24 of operating fluid under pressure, whereas the fluid outlet ports 20 in the cylinders 12 are in communication through a common fluid discharge line 26 with a fluid reservoir 28. The operating fluid source 24 is shown as consisting of a constant displacement pump 30 which is usually driven by an engine (not shown) of the vehicle and which is operative to suck in fluid from the reservoir, and a hydro-pneumatic accumulator 32 which is connected to the discharge side of the pump 30 through an unloading valve 34 having a drain port opened to the reservoir 28, as is customary in the art.

A first flow cut-off valve unit 36 having a solenoid-operated actuator 38 is disposed in the operating fluid supply line 22. The first flow cut-off valve unit 36 is of the type which is normally held in a position to open the fluid supply line 22 so that the fluid under pressure supplied from the operating fluid source 24 is fed to the cylinders 12 of the individual suspension units 10 through the operating fluid supply line 22 and the fluid inlet ports 18 in the cylinders 12. The first flow cut-off valve unit 36 is actuated into a position to shut off the operating fluid supply line 22 when the solenoid-operated actuator 38 incorporated thereinto is energized. In the fluid discharge line 26 is disposed a second flow cut-off valve unit 40 which has first and second solenoid-operated actuators 42 and 44. An auxiliary operating fluid supply line 46 leads from the operating fluid source 24 and terminates in the second flow cut-off valve unit 40. The second flow cut-off valve unit 40 is adapted to be normally held in a first position to open the fluid discharge line 26 and to shut off the auxiliary operating fluid supply line 46, a second position to shut off both the fluid discharge line 26 and the auxiliary operating fluid supply line 46, and a third position to shut off the fluid discharge line 26 and to provide communication between the auxiliary operating fluid supply line 46 and the fluid discharge line 26 upstream of the valve unit 40. The second flow cut-off valve unit 40 is held in the first position when the first and second solenoid-operated actuators 42 and 44 remain de-energized and are brought into the second position when the first solenoid-operated actuator 42 is energized or into the third position when the second solenoid-operated actuator 44 is energized. When the solenoid-operated actuator 38 of the first flow cut-off valve unit 36 and the first and second solenoid-oprated actuators 42 and 44 of the second flow cut-off valve unit 40 are kept de-energized, communication is provided between the operating fluid source 24 and the fluid inlet port 18 in each of the cylinders 12 through the main operating fluid supply line 22 and between the fluid outlet port 20 in each of the cylinders 12 and the fluid reservoir 28 so that the individual suspension units 10 are operative to automatically adjust the level of the vehicle body over the ground in accordance with the amount of load exerted on the vehicle body. When, on the other hand, the solenoid-operated actuator 38 of the flow cut-off valve unit 36 and the first solenoid-operated actuator 42 of the seocnd flow cut-off valve unit 40 are energized concurrently, then the main and auxiliary operating fluid supply lines 22 and 46 and the fluid discharge line 26 are closed so that the fluid in the individual supsension units 10 are locked up or confined. Under these conditions, the suspension units 10 are unable to adjust the level of the vehicle body even though the vehicle may sideways roll or away or may be subjected to variation in the amount of load and, thus, serve merely as shock absorbers. When, however, solenoid-operated actuator 38 of the first flow cut-off valve unit 36 and the first solenoid-operated actuator 42 of the second flow cut-off valve unit 40 remain de-energized and, instead, the second solenoid-operated actuator 44 of the second flow cut-off valve unit 40 is energized, then communication is established between the operating fluid source 24 and the fluid inlet port 18 of each of the cylinders 12 through the main operating fluid supply line 22 and between the fluid source 24 and the fluid outlet port 20 of each cylinder 12 through the auxiliary operating fluid supply line 46 and the portion of the fluid discharge line 26 upstream of the second flow cut-off valve unit 40. An increased fluid pressure is consequently directed to each of the cylinders 12 of the suspension unit 10 so that the vehicle body is lifted or jacked up to a desired height.

The solenoid-operated actuators 38, 42 and 44 above described are energized and de-energized selectively under the control of an electric control circuit 48, the detailed construction of which is illustrated in FIG. 2.

Referring to FIG. 2, the control circuit 48 comprises an inclination sensor 50 which is adapted to an angle of side roll of the vehicle body and to produce an output voltage which is proportional to the detected angle of vehicle side roll as will be encountered when the vehicle turns a curved path. The inclination sensor 50 has an output terminal which is connected to an integrating circuit which is composed of a serial combination of a resistor 52 and a capacitor 54. The integrating circuit has an output terminal 56 at a node between the resistor 52 and the cooperating capacitor 54. The output terminal 56 of the integrating circuit is connected to a voltage dividing circuit which consists of resistors 58 and 60 which are arranged in parallel to the capacitor 54. A first transistor 62 of the n-p-n junction type has a base connected to a node between the resistors 58 and 60. The first transistor 62 has an emitter connected to the base of a second transistor 64 of the n-p-n junction type and a collector connected to the base of a third transistor 66 which is of the p-n-p junction type. The collector of the second transistor 64 is also connected to the base of the third transistor 66. The third transistor 66 has a collector connected direct to a constant voltage source of, for example, 12 volts. The base of the third transistor 66 is connected through a resistor 68 to the constant voltage source. The emitter circuit of the transistor 66 is connected in parallel to coils 68 and 70 forming part of the previously mentioned solenoid-operated actuator 38 of the first flow cut-off valve unit 36 and the first solenoid-operated actuator 42 of the second flow cut-off valve unit 40, respectively, shown in FIG. 1. The solenoid coils 68 and 70 are shunted by diodes 72 and 74, respectively, for being protected from counter electromotive forces which might otherwise be created in the coils 68 and 70. Designated by reference numerals 72 and 74 are diodes which are connected in parallel between the emitter of the third transistor 66 and the combinations of the coils 68 and 70 and the diodes 72 and 74 for preventing reverse flows of currents to the emitter of the third transistor 66. The emitter electrode of the second transistor 64 is grounded. The first, second and third transistors 62, 64 and 66 make up a switching circuit which becomes conductive when the potential at the output terminal 56 of the integrating circuit exceeds a predetermined level which is inherent in the first transistor 62.

A manually operated three-position switch unit is provided as generally designated by reference numeral 80 in FIG. 2. The switch unit 80 comprises first, second and third stationary contact elements 82, 84 and 86 and a movable contact element 88 which is connected to a source of constant voltage of, for example, 12 volts. The movable contact element 88 can be manually moved and connected to any of the stationary contact elements 82, 84 and 86 by a vehicle driver. The first stationary contact element 82 is to hold the control circuit 48 in a condition to enable the suspension system to maintain its self-levelling function. The first stationary contact element 82 is thus connected to ground. The second stationary contact element 84 is intended to lock up the fluid pressure in the suspension units and to thereby cause the suspension system to lose its self-levelling function. The second stationary contact element 84 is, for this purpose, connected to a coil 90 of the previously described second solenoid-operated actuator 44 of the second valve unit 40. The solenoid coil 90 is shunted by a diode 92 which is adapted to protect the coil 90 from a counter electromotive force. On the other hand, the third stationary contact element 86 is provided for fail-safe purposes, causing the control circuit 48 to be short-circuited to ground in the event a failure takes place in the electric control circuit 48 or in the hydraulic circuit illustrated in FIG. 1. The thrid stationary contact element 86 is thus connected through a resistor 94 to the base of a fourth transistor 96 of the n-p-n junction type. The fourth transistor 96 has a collector electrode connected to the output terminal 56 of the integrator circuit composed of the resistor 52 and the capacitor 54. The emitter electrode of the fourth transistor 96 is grounded.

The operation of the self-levelling vehicle suspension system which is thus constructed and arranged will now be described with concurrent reference to FIGS. 1 and 2.

When the vehicle is operating under normal conditions, the movable contact element or wiper 88 should be connected to the first stationary contact element 82 so that the coil 90 of the second solenoid-operated actuator 44 of the second valve unit 40 remains de-energized and concurrently the fourth transistor 96 of the control circuit 48 remains non-conductive in the absence of a positive potential at the base thereof. When, under these conditions, the vehicle takes a "slalom" or serpentine zigzag path, the vehicle tends to sideways roll in either direction so that the inclination sensor 50 produces an output voltage which is proportional to the detected angle of roll of the vehicle. The output voltage from the inclination sensor 50 is integrated with respect to time by the integrating circuit composed of the resistor 52 and the capacitor 54 so that an integrated output voltage appears at the node 56 between the resistor 52 and the capacitor 54. The integrated output voltage is divided into suitable fractions by means of the voltage dividing circuit consisting of the resistors 58 and 60 and one of the voltage fractions thus produced is fed to the base of the first transistor 62. If, in this instance, the voltage applied to the base of the first transistor 62 remains lower than a predetermined level dictated by the transistor 62, the first transistor 62 is kept non-conductive and accordingly the second and third transistors 64 and 66 are maintained in non-conduction states. The coils 68 and 70 are thus kept de-energized so that the solenoid-operated actuator 38 of the first flow cut-off valve unit 36 and the first solenoid-operated actuator 42 of the second flow cut-off valve unit 40 are inoperative. As a consequence, the first flow cut-off valve unit 36 is held in the position to open the operating fluid supply line 22 and, at the same time, the second flow cut-off valve unit 40 is held in the previously mentioned first position to open the main operating fluid supply line 26 and to shut off the auxiliary operating fluid supply line 56. The cylinders 12 of the individual suspension units 10 are therefore in communication with the operating fluid source 24 through the fluid inlet ports 18 therein and with the fluid reservoir 28 through the fluid outlet ports 20 therein. The suspension system as a whole is thus allowed to provide the self-levelling function, automatically adjusting the vertical position of the vehicle body over the ground level in accordance with the amount of load exerted on the vehicle body.

When, however, the voltage applied to the base of the first transistor 62 reaches the predetermined level, then the first transistor 62 becomes conductive so as to render the second and third transistors 64 and 66 conductive. The solenoid coils 68 and 70 are consequently energized from the constant voltage source so that the solenoid-operated actuator 38 of the first flow cut-off valve 36 and the first solenoid-operated actuator 42 of the second flow cut-off valve unit 40 are made operative to shut off the main and auxiliary operating fluid supply lines 22 and 46 and the fluid discharge line 26. The supply of the operating fluid to the suspension units 10 and the discharge of the fluid from the suspension units 10 are, in this manner, interrupted so that the suspension units 10 are disabled to provide the self-levelling functions and serve merely as shock absorbers. When, thus, the inclination sensor 50 is producing a relatively high output voltage for a relatively short duration or a relatively low output voltage for a relatively long duration in response to a side roll condition of the vehicle as encountered when the vehicle is running on a curved or meandering road, the vehicle is prevented from being sideways inclined excessively as would otherwise be caused if the self-levelling functions of the suspension system were maintained as previously explained.

When the vehicle is then steered straight ahead, then the inclination sensor 50 ceases to deliver an output voltage so that the capacitor 54 is discharged, thereby reducing the potential at the base of the first transistor 62. The first transistor 62 and accordingly the second and third transistors 64 and 66 are therefore rendered non-conductive so that the solenoid coils 68 and 70 are de-energized. Fluid communication is consequently established for a second time between the fluid inlet port 18 of each cylicer 12 and the operating fluid source 24 and the fluid outlet port 20 of the cylinder and the fluid reservoir 28, thereby enabling each of the suspension units 10 to provide the self-levelling function.

When it is desired that the vehicle be lifted or jacked up for repair of servicing purposes, the movable contact element or wiper 88 of the switch unit 80 should be manually moved and connected to the second stationary contact element 84. In this instance, the solenoid coil 90 of the second solenoid-operated actuator 44 of the second flow cut-off valve unit 40 is energized from the constant voltage source through the movable contact element 88 and the second stationary contact element 84 so that the second flow cut-off valve unit 40 is brought into the previously mentioned third position in which the discharge fluid line 26 is isolated from the fluid reservoir 28 and communicates with the auxiliary operating fluid supply line 46. Since, under these conditions, the first flow cut-off valve unit 36 is held in the position to open the main operating fluid supply line 22 with its solenoid-operated actuator 38 kept de-energized, the cylinder 12 of each of the suspension units 10 is permitted to communicate with the operating fluid source 24 through both of its fluid inlet and outlet ports 18 and 20 with the result that the individual suspension units 10 are extended to lift or jack up the vehicle over the ground or a platform in a repair shop. A suitable support such as a pedestal may then be interposed between the underside of the vehicle body and the ground or the platform so that the vehicle is held in the lifted position. If, the movable contact element or wiper 88 is thereafter moved back to the first stationary contact 82, then the initial condition of the suspension system is restored so that the road wheels adjacent the support or pedestal underlying the vehicle chasis will be raised together with the anit-roll bar which is interconnected between the suspension arms associated with the right and left road wheels, thereby providing a jack-up effect.

To have the vehicle lowered to a normal vertical position, the movable contact element or wiper 88 should be returned to the second stationary contact element 84 for lifting the vehicle body in a manner previously discussed. The support or pedestal which has been interposed between the vehicle body and the ground or the pedestal should thereafter be removed. The movable contact element or wiper 88 should then be moved back to the first stationary contact element 82 so that the vehicle body can be automatically level adjusted to the initial vertical position.

In the event the electric control circuit 48 shown in FIG. 2 or the hydraulic circuit shown in FIG. 1 happens to fail during cruising or stoppage of the vehicle, then the movable contact element or wiper 88 should be moved and connected to the third stationary contact element 86. Under these conditions, the base of the fourth transistor 96 is energized from the constant voltage source through the movable contact element 88 and the third stationary contact element 86. The fourth transistor 96 is made conductive so that the output voltage from the inclination sensor 50 is short circuited to ground through the node 56 between the resistor 52 and the capacitor 54 and the collector and emitter electrodes of the fourth transistor 96. The capacitor 54 is consequently disabled from being charged with the current from the inclination sensor and accordingly no positive potential appears at the output terminal 56 of the integrating circuit consisting of the resistor 52 and the capacitor 54. The first, second and third transistors 62, 64 and 66 are all maintained in non-conduction states with the result that the first and second flow cut-off valve units 36 and 40 are held in the positions to enable the suspension system to behave as a usual self-levelling suspension system if the hydraulic circuit shown in FIG. 1 stays intact. The second stationary contact 86 and the fourth transistor 96 thus make up a fail-safe arrangement in the self-levelling suspension system embodying the present invention. Provision of such a fail-safe arrangement is, however, not essential in the suspension system according to the present invention and may therefore be dispensed with where desired.

What is claimed is:

1. In a self-levelling suspension system for an automotive vehicle including at least one hydropneumatic suspension unit actuated by a fluid pressure for adjusting the vertical position of the suspended portion of the vehicle body, an operating fluid supply line for providing communication between the suspension unit and a source of operating fluid for feeding the operating fluid to the suspension unit from the fluid source when open, a fluid discharge line which leads from the suspension unit for discharging the fluid from the suspension unit when open, a first valve means disposed in the fluid supply line for shutting off the fluid supply line when actuated, a second valve means disposed in the fluid discharge line for shutting off the fluid discharge line when actuated, and control means responsive to side roll of the vehicle body for actuating the first and second valve means to close the fluid supply and discharge lines in response to a vehicle roll angle larger than a predetermined limit, the improvement that said second valve means has first and second valve actuating means and which further comprises an auxiliary operating fluid supply line for providing communication between the source of the operating fluid and the fluid discharge line through said second valve means, said second valve means having a first position to open the fluid discharge line and to close the auxiliary operating fluid supply line, a second position to close both of the fluid discharge line and the auxiliary operating fluid supply line, and a third position to close the fluid discharge line and to provide communication between the fluid discharge line and the auxiliary operating fluid supply line, the second valve means being in the first position when both of the first and second valve actuating means are inoperative, in the second position when the first valve actuating means is actuated, and in the third position when the second valve actuating means is actuated, and said control means responsive to side roll of the vehicle body and including a switch means having a first position to enable the first valve means and the first valve actuating means of the second valve means to be actuated in response to vehicle roll angle larger than a predetermined limit and a second position to actuate the second valve actuating means of the second valve means.

2. A self-levelling suspension system as claimed in claim 1, in which said control means further includes an inclination sensing means responsive to a vehicle roll angle for producing an output voltage proportional to the detected vehicle roll angle, an integrating circuit for integrating the output voltage of the sensing means with respect to time for producing an integrated output voltage, a voltage dividing curcuit for producing an output voltage proportional to the integrated output voltage, and a switching circuit connected to an output terminal of the voltage dividing circuit and electrically connected to said first valve means and said first valve actuating means of the second valve means for maintaining the first valve actuating means of the second valve means inoperative when the output voltage from the voltage dividing circuit is lower than a predetermined level and actuating the first valve means and the first valve actuating means of the second valve means when the output voltage from the voltage dividing circuit is higher than the predetermined level.

3. A self-levelling suspension system as claimed in claim 2, in which said control means further includes short-circuiting means for making a short circuit between an output terminal of the integrating circuit and ground when manually actuated.

4. A self-levelling suspension system as claimed in claim 3, in which said switch means has a third position to actuate said short circuiting means.

* * * * *